(No Model.)
L. A. NEGRAVAL.
CUFF HOLDER.
No. 434,944. Patented Aug. 26, 1890.
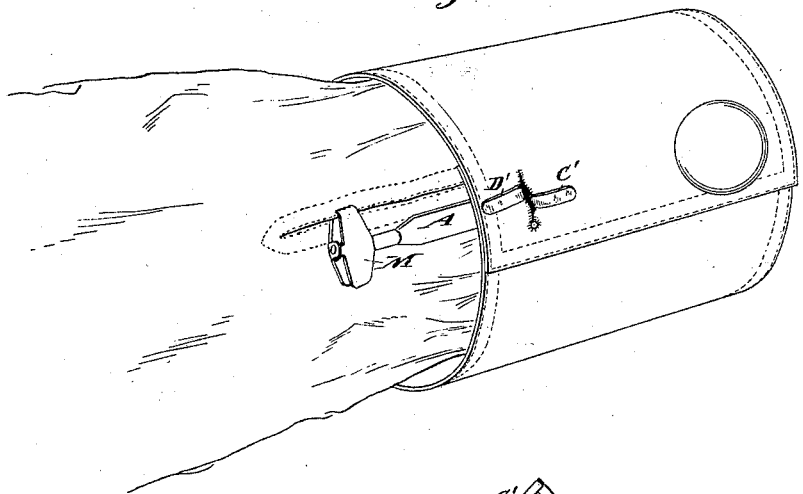
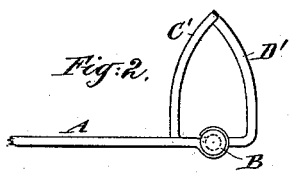
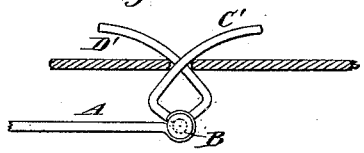
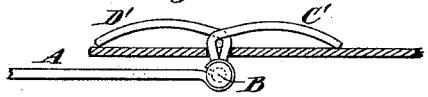
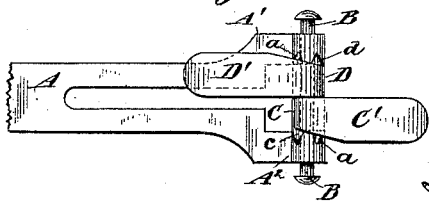
Witnesses:
Charles R. Searle.
Chas. S. Barber.
Inventor:
Louis A. Negraval
by his attorney
Thomas Drew Stetson

UNITED STATES PATENT OFFICE.

LOUIS A. NEGRAVAL, OF JERSEY CITY, NEW JERSEY.

CUFF-HOLDER.

SPECIFICATION forming part of Letters Patent No. 434,944, dated August 26, 1890.

Application filed June 21, 1890. Serial No. 356,225. (No model.)

*To all whom it may concern:*

Be it known that I, LOUIS A. NEGRAVAL, a citizen of the United States, residing in Jersey City, in the county of Hudson and State of New Jersey, have invented a certain new and useful Improvement in Cuff-Holders, of which the following is a specification.

There have been many attempts to produce convenient fastening means for engaging an ordinary cuff by its button-holes and securing it in place on the shirt-sleeve. It is common to provide such with spring-clasps for engaging with any convenient part of the shirt-sleeve and have a shank of sufficient length to hold the cuff in the correct position, while the clasp takes hold considerably above the wristband. I employ such.

My improvement relates to the parts which take hold of the cuff. I form the shank of hard brass or other elastic metal and fork it, and bend the extremity of each fork to form a circular loop or eye embracing a transverse pin. I connect these eyes loosely by a pin with heads so far apart that the forks may be spread sufficiently apart and form the inner face of each eye with V-shaped notches. On the pin between the extremities of the forks I mount two short sleeves having plane faces presented toward each other, but having their outer sides or faces formed with projections adapted to engage in the V-shaped notches in the eyes. Each sleeve carries an L-shaped wing, bent in opposite directions one to the other. The outer part of each of these L-shaped wings is longer than the inner part, and is slightly curved and provided with a smoothly-rounded end. In the use of the cuff-holder these wings are brought into such position that their rounded points or ends coincide and are easily inserted into a button-hole in the cuff, either from the outside and thrust inward or from the inside and thrust outward. Either way the movement of thrusting the device causes the wings to be thrust through the button-hole, and by reason that the curvature of the two wings is in opposite directions the wings are each turned on the pin or pivot and caused to extend in opposite directions, one wing reaching down toward the hand and the other reaching up toward the elbow. If they do not naturally assume the correct position, the wearer urges them fully into place by a gentle pressure with the finger of the other hand and the engagement is complete. They will remain strongly and reliably engaged with the cuff under all ordinary and extraordinary conditions of use. When it is desired to disengage the holder from the cuff, the fingers of the other hand are applied to throw the wings up into a position at right angles to the shank, and the device is then readily withdrawn.

There is a sufficient number of notches in the inner faces of the eyes to allow the device to be operated in two positions—one facing at right angles to the shank in one direction, and the other facing at right angles to the shank in the opposite direction. This makes the device reversible. The clasp at the other end of the device is capable of swiveling, so that it can also be reversed, if desired.

The accompanying drawings form a part of this specification and represent what I consider the best means of carrying out the invention.

Figure 1 is a perspective view showing the cuff-holder in place. The remaining figures show portions on a larger scale. Fig. 2 is a side elevation. Fig. 3 is a corresponding view showing the holder partially engaged with the cuff. Fig. 4 is a corresponding view showing the holder fully engaged. Fig. 5 is a plan view corresponding to Fig. 4.

Similar letters of reference indicate corresponding parts in all the figures where they appear.

A is the shank, and A' A² an elastic fork formed by splitting the shank from the outer end, as shown. Each arm of the fork is bent around to form an eye, which serves as a bearing for the transverse pin and also performs an important function in holding the wings in their several positions. The inner face of each eye is notched, as indicated by $a$.

B is a pin extending through the bearings in the eyes formed on the ends of the arms A' A² and efficiently headed at each end. The pin is of such length as will allow the arms A' A² to be sprung apart.

C and D are short sleeves fitting easily on the pin B and having V-shaped projections $c\ d$ adapted to engage in the notches $a$. The sleeve C is provided with an L-shaped wing C', the longer outer arm of which is slightly curved and is smoothly rounded at its outer end. The sleeve D is similarly equipped, except that the L bends in the opposite direction to that of the wing C'.

M is a spring-clasp swiveled on the opposite end of the shank and adapted to engage with the edge of the opening in the shirt-sleeve.

The wings are engaged in the button-holes of a cuff by simply setting them with their ends together and thrusting them home. The long part of each wing in being thrust endwise through the button-hole is folded down, one wing C' being folded in one direction and the other wing D' being folded in the opposite direction. If the cuff is thick and stiff, the final adjustment of position may be aided by a gentle pressure of the fingers. Now the hand being thrust through the cuff and the clasp M being engaged with the edge of the opening in the shirt-sleeve, the adjustment is complete.

To detach the cuff, the wings C' D' are caused to each describe a quarter-revolution on the pin B, and then they may be readily removed in the obvious manner. Until such turning of the wings is effected, the device holds the cuff tenaciously.

Modifications may be made without departing from the principle or sacrificing the advantages of the invention. The short arm of each L-shaped wing may be somewhat longer or shorter than shown. So, also, the long arm may be varied in its dimensions and in its curvature. The notches in the inner faces of the eyes on the respective arms of the fork may be less in number. I have shown four in each, and two corresponding projections on each of the sleeves C and D, each adapted to engage its respective sleeve with two of the notches in the eye of the adjacent arm in all the positions in which the device may be set; but a less number of notches may suffice. The notches and projections will maintain the same relation and produce the same effect if the notches are on the sleeves and the projections are on the eyes.

I claim as my invention—

1. In a cuff-holder, the shank A, having the elastic arms A' A² adapted to be spread apart and to spring together, in combination with the sleeves C D, and angular wings C' D', adapted to be turned to extend in opposite directions, the inner faces of the arms and the corresponding surfaces of the sleeves being formed with notches and projections to hold them strongly in position, substantially as herein specified.

2. The reversible cuff-holder described, having the L-shaped wings C' D', in combination with a forked shank A A' A² and clasp M, the inner faces of the eyes on the fork and the outer faces of the sleeves being provided with recesses and projections arranged, as shown, so as to engage each other in four positions, allowing the wings to be held in the open or closed positions on either face of the shank, as herein specified.

In testimony whereof I have hereunto set my hand, at New York city, in the presence of two subscribing witnesses.

LOUIS A. NEGRAVAL.

Witnesses:
WM. C. HELFRICH,
MINNIE TWOMEY.